(12) United States Patent
Bolle et al.

(10) Patent No.: US 8,902,281 B2
(45) Date of Patent: Dec. 2, 2014

(54) SYSTEM AND METHOD FOR IMAGE STABILIZATION IN VIDEOCONFERENCING

(75) Inventors: Cristian A. Bolle, Bridgewater, NJ (US); Alex Duque, Hillsborough, NJ (US); Roland Ryf, Aberdeen, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 211 days.

(21) Appl. No.: 13/538,916

(22) Filed: Jun. 29, 2012

(65) Prior Publication Data
US 2014/0002579 A1 Jan. 2, 2014

(51) Int. Cl.
*H04N 7/14* (2006.01)

(52) U.S. Cl.
USPC .................................... 348/14.12; 348/14.07

(58) Field of Classification Search
USPC ........... 348/14.01, 14.08, 14.07, 14.12, 14.15
See application file for complete search history.

(56) References Cited

U.S. PATENT DOCUMENTS

| | | | |
|---|---|---|---|
| 5,400,069 A | 3/1995 | Braun et al. | |
| 5,500,671 A | 3/1996 | Andersson et al. | |
| 5,666,155 A | 9/1997 | Mersereau | |
| 6,193,384 B1 | 2/2001 | Stein | |
| 6,385,352 B1 | 5/2002 | Roustaei | |
| 6,567,116 B1 | 5/2003 | Aman et al. | |
| 6,710,797 B1 | 3/2004 | McNelley et al. | |
| 6,771,303 B2 | 8/2004 | Zhang et al. | |
| 6,784,916 B2 | 8/2004 | Smith | |
| 6,894,839 B2 | 5/2005 | Sugiyama et al. | |
| 6,919,907 B2 | 7/2005 | Berstis | |
| 7,034,866 B1 | 4/2006 | Colmenarez et al. | |
| 7,050,084 B1 | 5/2006 | Lang | |
| 7,057,637 B2 | 6/2006 | White | |
| 7,202,887 B2 | 4/2007 | Hillis et al. | |
| 7,209,160 B2 | 4/2007 | McNelley et al. | |
| 7,602,276 B2 | 10/2009 | Madau | |
| 7,679,639 B2 | 3/2010 | Harrell et al. | |
| 7,692,680 B2 | 4/2010 | Graham et al. | |
| 7,692,780 B2 | 4/2010 | Oomori et al. | |
| 7,710,448 B2 | 5/2010 | De Beer et al. | |
| 7,763,546 B2 | 7/2010 | Kothari et al. | |
| 7,808,540 B2 | 10/2010 | Cok | |

(Continued)

FOREIGN PATENT DOCUMENTS

| | | |
|---|---|---|
| WO | 2004109630 A1 | 12/2004 |
| WO | 2006021788 A1 | 3/2006 |
| WO | 2010078535 A1 | 7/2010 |
| WO | 2014004013 A1 | 1/2014 |

OTHER PUBLICATIONS

International Search Report and Written Opinion, International Application No. PCT/US2013/044409, Applicant: Alcatel Lucent, Nov. 5, 2013, 12 pages.

(Continued)

*Primary Examiner* — Olisa Anwah
(74) *Attorney, Agent, or Firm* — Hitt Gaines, PC

(57) ABSTRACT

A terminal comprises a display substrate and an actuator configured to move the display substrate in a cyclic movement over a viewing area. A proximity sensor is configured to generate detection signals. An image controller, configured to receive the detection signal, calculates a cycle time of the cyclic movement of the display substrate and controls at least one of a transmission rate of the display data to the display substrate and the movement of the display substrate caused by the actuator.

20 Claims, 4 Drawing Sheets

(56) References Cited

U.S. PATENT DOCUMENTS

| | | | |
|---|---|---|---|
| 8,063,929 | B2 | 11/2011 | Kurtz et al. |
| 8,096,660 | B2 | 1/2012 | Vertegaal et al. |
| 8,154,582 | B2 | 4/2012 | Border et al. |
| 8,223,186 | B2 | 7/2012 | Derocher et al. |
| 8,228,371 | B2 | 7/2012 | Sobel et al. |
| 8,253,770 | B2 | 8/2012 | Kurtz et al. |
| 8,264,518 | B2 | 9/2012 | Khouri et al. |
| 8,279,262 | B2 | 10/2012 | Graham et al. |
| 2003/0197779 | A1 | 10/2003 | Zhang et al. |
| 2004/0196359 | A1 | 10/2004 | Blackham |
| 2006/0007222 | A1 | 1/2006 | Uy |
| 2006/0204050 | A1 | 9/2006 | Takizawa |
| 2007/0002130 | A1 | 1/2007 | Hartkop |
| 2007/0120879 | A1 | 5/2007 | Kanade et al. |
| 2007/0247417 | A1 | 10/2007 | Miyazaki et al. |
| 2007/0263080 | A1 | 11/2007 | Harrell et al. |
| 2007/0273839 | A1 | 11/2007 | Doi et al. |
| 2008/0012936 | A1 | 1/2008 | White |
| 2009/0002270 | A1 | 1/2009 | Chui |
| 2009/0041298 | A1 | 2/2009 | Sandler et al. |
| 2009/0122572 | A1 | 5/2009 | Page et al. |
| 2009/0278913 | A1 | 11/2009 | Rosenfeld et al. |
| 2010/0014390 | A1 | 1/2010 | Flum |
| 2010/0073456 | A1 | 3/2010 | Bolle |
| 2010/0097448 | A1* | 4/2010 | Gilbert et al. .................. 348/51 |
| 2010/0302343 | A1 | 12/2010 | Bolle |
| 2011/0043617 | A1 | 2/2011 | Vertegaal et al. |
| 2011/0102538 | A1 | 5/2011 | Tan |
| 2011/0137693 | A1 | 6/2011 | Mattimore et al. |
| 2011/0149012 | A1* | 6/2011 | Bolle et al. ................. 348/14.08 |
| 2012/0040490 | A1 | 2/2012 | Gallazzo et al. |
| 2012/0044199 | A1 | 2/2012 | Karpin et al. |
| 2014/0002577 | A1 | 1/2014 | Bolle et al. |

OTHER PUBLICATIONS

International Search Report and Written Opinion dated Mar. 6, 2014, International Application No. PCT/US2013/074849, Applicant: Alcatel-Lucent USA Inc., 10 pages.

"Electrophoresis", http:lcp.elis.ugent.be/research/electrophoresis, Liquid Crystals & Photonics Group, Universiteit Gent (Belgium), 11 pages.

"How Mirasol® Displays Work: Micro-electro-mechanical Systems (MEMS) Drive IMOD Reflective Technology", www.mirasolidisplays.com/mobile-display-imod-technology.php?, 2009 Qualcomm MEMS Technologies, Inc., 1 page.

"TFT LCD Specification—Model No. PQ 3Qi-01", Doc No. PQ003, Pixel Qi Corporation, Jun. 28, 2010, 23 pages.

C. Bolle; U.S. Appl. No. 12/238,096; "Videoconferencing Terminal and Method of Operation Thereof to Maintain Eye Contact"; filed Sep. 25, 2008; 36 pages.

C. Bolle; U.S. Appl. No. 12/472,250; "Videoconferencing Terminal and Method of Operation Thereof to Maintain Eye Contact"; filed May 26, 2009; 25 pages.

C. Bolle et al; U.S. Appl. No. 12/633,656; "Imaging Terminal"; filed Dec. 8, 2009; 21 pages.

C. Bolle et al; U.S. Appl. No. 12/640,998; "Videoconferencing Terminal With a Persistence of Vision Display and a Method of Operation Thereof to Maintain Eye Contact"; filed Dec. 17, 2009; 36 pages.

M. Gross et al; "blue-c: A Spatially Immersive Display and 3D Video Portal for Telepresence"; SIGGRAPH '03 ACM SIGGRAPH 2003 Papers; ACM New York, NY; 2003; 9 pages.

S. Izadi et al; "Going Beyond the Display: A Surface Technology with an Electronically Switchable Diffuser"; UIST '08 Proceedings of the 21st Annual ACM Symposium on User Interface Software and Technology; ACM New York, NY; 2008; 10 pages.

H. Ishii et al; "ClearBoard: A Seamless Medium for Shared Drawing and Conversation with Eye Contact"; CHI '92 Proceedings for the SIGCHI Conference on Human Factors in computing Systems; ACM New York, NY; May 3-7, 1992; 10 pages.

M. Kuechler et al; "HoloPort—A Device for Simultaneous Video and Data Conferencing Featuring Gaze Awareness"; Virtual Reality Conference 2006 Conference Publications; Mar. 25-29, 2006; 7 pages.

KH Tan et al; "ConnectBoard: A Remote Collaboration System that Supports Gaze-awareness Interaction and Sharing"; IEEE International Workshop on Multimedia Signal Processing 2009, MMSP '09; Oct. 5-7, 2009; 3 pages [Best Available Copy].

S. Shiwa et al; "16.2: A Large-Screen Visual Telecommunication Device Enabling Eye Contact", SID 91 Digest, ISSN0097-0966x/91/0000-327 (1991); 2 pages [Best Available Copy].

"Liquid Crystals and Photonics Group," Electrophoresis, Universteit Gent, http://lcp.elis.ugent.be/research/electrophoresis, 11 pages, Dec. 15, 2008.

International Search Report and Written Opinion of the International Searching Authority dated Jun. 2, 2014, Applicant: Alcatel-Lucent USA Inc., 13 pages.

* cited by examiner

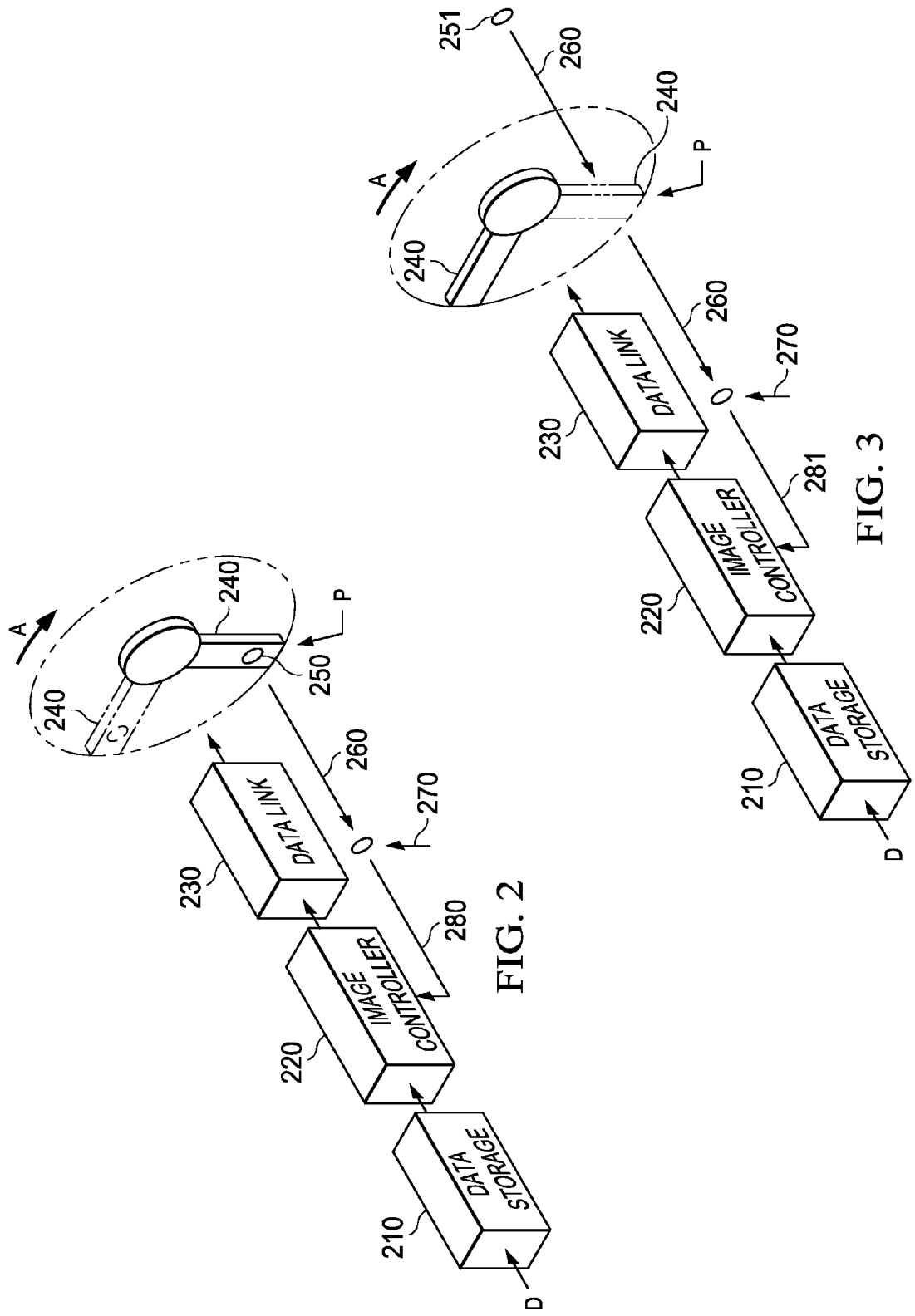

- 610 — MOVE DISPLAY SUBSTRATE OVER A VIEWING AREA
- 620 — PROXIMITY DETECTION OF DISPLAY SUBSTRATE DURING A CYCLE
- 630 — GENERATE DETECTION SIGNAL
- 640 — CALCULATE CYCLE TIME OF DISPLAY SUBSTRATE
- 650 — GENERATE CONTROL COMMAND
- 660 — CONTROL TRANSMISSION RATE OF DISPLAY DATA OR MOVEMENT SPEED OF DISPLAY SUBSTRATE

SYSTEM AND METHOD FOR IMAGE STABILIZATION IN VIDEOCONFERENCING

TECHNICAL FIELD

The disclosure is directed, in general, to a videoconferencing technique.

BACKGROUND

This section introduces aspects that may be helpful in facilitating a better understanding of the disclosure. Accordingly, the statements of this section are to be read in this light and are not to be understood as admissions about what is in the prior art or what is not in the prior art.

Communication via computer networks frequently involves far more than transmitting text. Computer networks, such as the Internet, can also be used for audio communication and visual communication. Still images and video are examples of visual data that may be transmitted over such networks.

One or more cameras may be coupled to a personal computer (PC) to provide visual communication. The camera or cameras can then be used to transmit real-time visual information, such as video, over a computer network. Dual transmission can be used to allow audio transmission with the video information. Whether in one-to-one communication sessions or through videoconferencing with multiple participants, participants can communicate via audio and video in real time over a computer network (i.e., voice-video communication). Typically the visual images transmitted during voice-video communication sessions depend on the placement of the camera or cameras.

SUMMARY

One aspect provides an apparatus. In one embodiment, the apparatus includes: a display substrate occupying less than an entirety of a viewing area and configured to display display data; an actuator configured to move the display substrate in a cyclic movement over the viewing area; a proximity sensor assembly configured to generate, at least once during a cycle of the movement of the display substrate, a detection signal; and an image controller configured to receive the detection signal generated by the proximity sensor assembly, calculate a cycle time of the cyclic movement of the display substrate and generate a command to control at least one of a transmission rate of the display data to the display substrate and the movement of the display substrate caused by the actuator.

In another aspect, a method for image stabilization in videoconferencing is disclosed. In one embodiment, the method includes: moving a display substrate in a cyclic movement over a viewing area and displaying a display data, the display substrate occupying less than an entirety of the viewing area; generating by a proximity sensor assembly, at least once during a cycle of the movement of the display substrate, a detection signal; receiving by an image controller the detection signal generated by the proximity sensor assembly; calculating a cycle time of the cyclic movement of the display substrate; and controlling at least one of a transmission rate of the display data to the display substrate and the movement of the display substrate caused by the actuator.

BRIEF DESCRIPTION OF THE DRAWINGS

Reference is now made to the following descriptions taken in conjunction with the accompanying drawings, in which:

FIG. 2 illustrates a schematic representation of certain elements of an embodiment of a videoconferencing terminal constructed according to the principles of the disclosure;

FIG. 3 illustrates a schematic representation of certain elements of another embodiment of a videoconferencing terminal constructed according to the principles of the disclosure;

DETAILED DESCRIPTION

Figure 1:
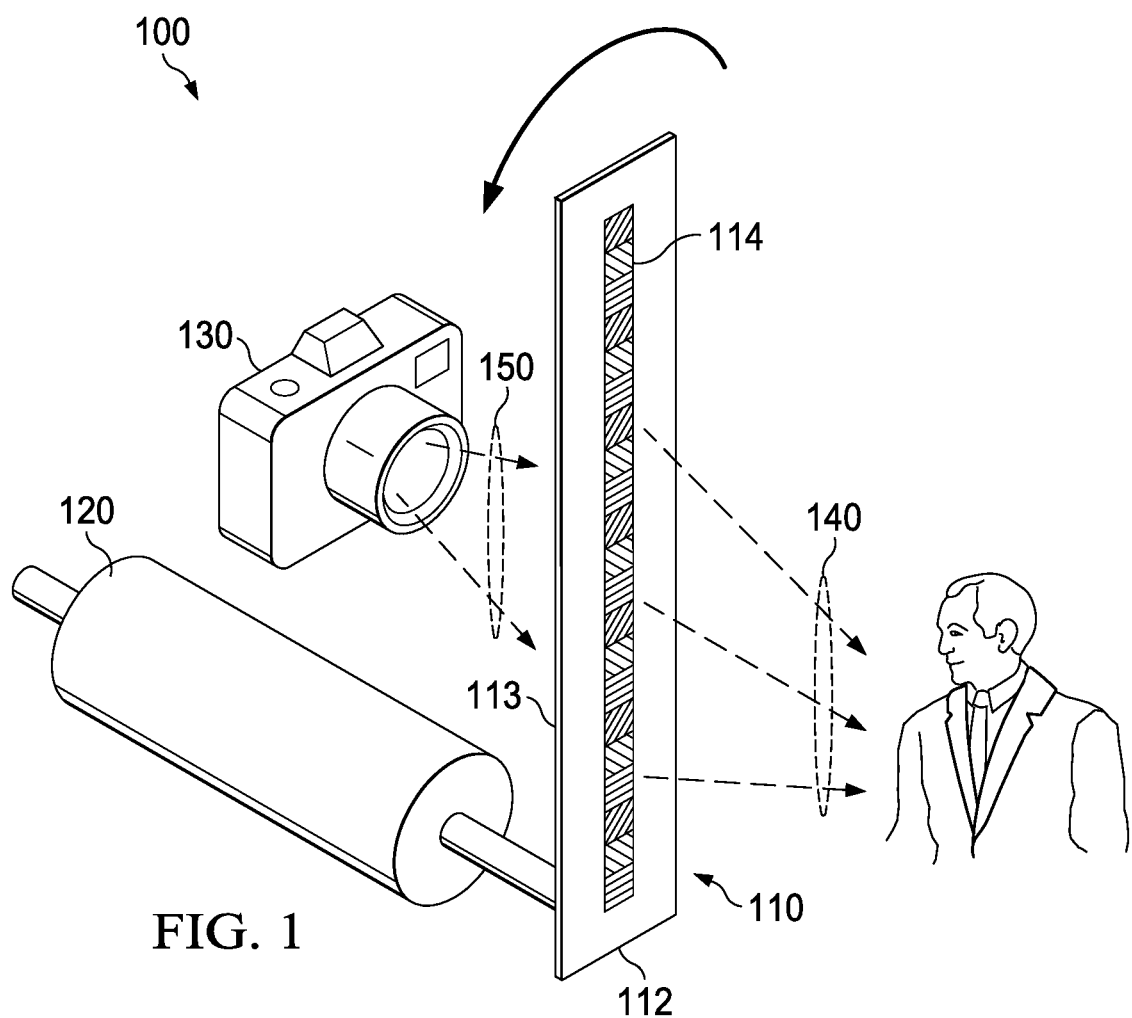
FIG. 1 illustrates a schematic representation of an embodiment of a videoconferencing terminal, in which the principles of the disclosure may be implemented.

The present disclosure relates in particular to stabilizing image display in a videoconferencing terminal (or apparatus).

Some description of a videoconferencing terminal with a persistence of vision display and a method of operation thereof to maintain eye contact may be found in U.S. patent application Ser. No. 12/640,998, entitled "Videoconferencing Terminal With A Persistence Of Vision Display And A Method Of Operation Thereof To Maintain Eye Contact," filed on Dec. 17, 2009, by Cristian A. Bolle, et al., and published as U.S. Publication No. 2011/0149012, the content of which is incorporated herein by reference in its entirety.

The videoconferencing terminals can display an image by employing an array of electronic light sources (e.g., red, green and blue light-emitting diodes (LEDs)) spun at a speed large enough such that the human eye can not follow the motion and will see a continuous image. If the electronic light sources are modulated in a synchronized way at even higher speed, an image can be displayed. For example, the electronic light sources may be rotated at a speed for an image repetition of 60 Hz and modulated at a speed of 1 MHz. A camera can then be located behind the electronic light sources that allows a video conference participant to establish eye contact by looking through the front of the terminal to the camera instead of, for example, looking at a camera mounted on the top or side of the terminal.

A display substrate is used to provide a persistence of vision display. The shape or type of display substrate may vary and may be based on the geometry of the viewing area of a particular videoconferencing terminal. For example, the display substrate includes a wheel with one or more vanes (or arms) extending from a center. The wheel is configured to carry on the front of each arm a necessary array of electronic light sources to accurately display an image while the structure is rotated by an actuator (e.g., a motor that may be centrally mounted with respect to a viewing area). As indicated above, an image repetition rate of 60 Hz may be used with the image repetition rate needing to be greater than 30 Hz. For a single arm at 30 Hz, the rotation speed of the arm translates to 1800 RPM. The rotation speed can be reduced proportionally to the number of arms that may be used to provide the display. An image repetition rate greater than a 100 Hz can be used to provide a higher quality display.

Any additional electronics needed to drive the electronic light sources can be advantageously mounted on the back of each arm and out of sight from a local participant. Power to drive the electronic light sources may be transferred over the shaft of the motor by a set of brushes or a coaxial transformer.

The display substrate can provide images of a remotely located videoconference participant while a camera (e.g., a video camera) mounted behind the spinning wheel captures images of a local videoconference participant through open areas associated with the spinning wheel. By having the camera located behind the display substrate and looking therethrough, both videoconference participants can establish eye contact and enhance the feeling of intimacy in the communication.

FIG. 1 is a schematic view of an embodiment of a videoconferencing terminal 100, constructed according to the principles of the disclosure. The videoconferencing terminal 100 is configured to simultaneously capture a camera image and provide a display image. The videoconferencing terminal 100 includes a display substrate 110, an actuator 120 and a camera 130. Additionally, the videoconferencing terminal 100 may include additional components typically included in a conventional videoconferencing terminal. For example, the videoconferencing terminal 100 may include a microphone, a speaker and a controller that directs the operation of the videoconferencing terminal 100. The microphone and speaker may be associated with the controller. In some embodiments, the videoconferencing terminal 100 may include a section that is a partially evacuated volume in which the display substrate 110 operates.

The display substrate 110 includes a substrate 112 having an array of electronic light sources 114 located thereon. The array 114 may be a single column array as illustrated or may include multiple columns. The array of electronic light sources 114 is sized to provide a persistence of vision display in a viewing area 140 when the display substrate 110 is moved over the viewing area 140. As such, the number of rows of the array of electronic light sources 114 may be equivalent or substantially equivalent to the radius (r) of the viewing area 140. The viewing area 140 may coincide with a substantial transparent substrate that is placed in front of the videoconferencing terminal 100 (i.e., opposite side of the display substrate 110 from the camera 130). The display substrate 110 occupies less than an entirety of the viewing area 140. Thus, the display substrate 110 is smaller than the viewing area 140. Accordingly, persistence of vision is relied on to provide a display image for the videoconferencing terminal 100.

The display substrate may be caused to move (e.g. rotate) by way of an actuator 120 located at a suitable position.

The videoconferencing terminal 100 also includes electronic circuitry 113 coupled to the array of electronic light sources 114. The electronic circuitry 113 is configured to control the array of electronic light sources 114 to form the display image. The electronic circuitry 113 may be located at any suitable position.

The electronic circuitry 113 is configured to direct the operation of each of the electronic light sources of the array 114. The electronic circuitry 113 may include a matrix of thin film transistors (TFT) with each TFT driving and/or controlling a particular electronic light source of the array 114. The electronic circuitry 113 may include components typically employed in a conventional array-type active backplane. In one embodiment, the electronic circuitry 113 may operate similar to an active backplane employed in a conventional LED display. However other known display elements may likewise be used. Power to drive the electronic light sources 114 (and the electronic circuitry 113) may be transferred over a shaft of the actuator by known means such as a set of mechanical brushes or through magnetic induction, for example in the form of a coaxial transformer.

Therefore, as described in relation to the embodiment of FIG. 1, an image of a remote object, e.g. a videoconference participant, may be displayed on the viewing area of the videoconferencing terminal as the display substrate moves (e.g. rotates) at a predetermine speed.

However, the speed of movement (e.g. rotation) of the display substrate may have direct effect on the appearance of the image on the display substrate. Indeed, if fluctuations are present in the speed of movement of the display substrate 110, the image may be displayed distorted or at least unstable to the human eye.

As the movement of the display substrate 110 is caused by a mechanically directed action of the actuator 120, it may in practice occur that such mechanical activation is not always stable. Lack of stability may occur, for example, due to fluctuations in the power supplied to the actuator, the manner in which power is applied to the actuator (e.g. powering by sudden pulses may typically cause more fluctuations as compared to a continuous smooth supply) or the manner in which the speed of the actuator is controlled. As previously mentioned, such lack of stability may cause distortion or instability in the image displayed. Therefore, it is desirable to provide a videoconferencing terminal with provisions directed to maintaining the displayed image stable, or at least reducing the effects of fluctuations in the speed of the display substrate, as it moves, on the displayed image.

According to the present disclosure, use is made of a proximity sensor assembly and an image controller which, in cooperation, allow for controlling the transmission rate of the display data to the display substrate or the movement of the display substrate caused by the actuator, thereby maintaining or improving the stability of the displayed image.

The image controller may be located at any convenient position. In some embodiments, the image controller may be located at a fixed position. In some alternative embodiments, the image controller may be located on the body of the display substrate as will be described further below.

In some embodiments, the proximity sensor assembly may be a combination of an optical emitter or an optical receiver. In other embodiments the proximity sensor assembly may comprise magnetic elements.

Referring now to FIG. 2, certain elements of a videoconferencing terminal are shown according to some embodiments. Display data D useable for displaying an image of a remote object may be received by the videoconferencing terminal and stored in a data storage module 210. This data D is intended to be transferred to the display substrate 240. Though not illustrated in FIG. 2, the display substrate 240 similarly includes electronic circuitry and electronic light sources as discussed with respect to the display substrate 110 of FIG. 1. The videoconferencing terminal further comprises an image controller 220. In some embodiments the image controller 220 is in charge of generating commands for triggering or adjusting the transmission rate of the display data D from the data storage module 210 to the display substrate 240 through a data link 230. In some embodiments the image controller 220 is in charge of generating commands to adjust the speed of movement of the actuator. In some embodiments the image controller 220 is in charge of both generating commands for triggering or adjusting the transmission rate of the display data D from the data storage module 210 to the display substrate 240 and generating commands to adjust the speed of movement of the actuator.

Once the display data D is received at electronic circuitry coupled to the display substrate 240, the electronic circuitry may drive the light sources (as described with reference to the electronic circuitry 113 FIG. 1) causing the light sources to display the image concerned.

According to some embodiments of the present disclosure, an optical emitter may be mounted at a suitable location on the display substrate. In the embodiment of FIG. 2, an optical emitter 250 is shown to be mounted on the rear surface (the surface opposite to the image display surface) of the display substrate 240. The optical emitter 250 is configured to emit an optical signal 260.

Further, an optical receiver 270 may be installed at a location suitable for receiving the optical signal 260 from the optical emitter 250, as shown in the embodiment of FIG. 2. The optical receiver 270 may receive the optical signal 260 during an optical coupling period in which the movement of the display substrate 240 causes the optical emitter 250 to establish optical coupling (optical contact) with the optical receiver 270, thereby allowing the latter to receive the optical signal 260. The position in which the optical coupling occurs is schematically shown in FIG. 2 by reference P.

Upon receipt of the optical signal 260 by the optical receiver 270, the latter may generate a detection signal 280 which is input into the image controller 220. As the display substrate 240 moves (e.g. rotates as shown by arrow A) away from position P, the optical coupling between the optical emitter 250 and the optical receiver 270 is interrupted (see e.g. the display substrate shown by of broken lines in FIG. 2). The interruption of the optical coupling continues until the display substrate 240 completes a cycle and arrives back to the position P where optical coupling is again established. At this occurrence, the optical receiver 270 may generate a second (subsequent) detection signal 280 which is again input into the image controller 220.

Based on the reception of the first detection signal and the subsequent detection signal, the image controller 220 may calculate a cycle time relative to the cyclic movement of the display substrate 240. Preferably the cycle time calculated may then be divided into a number of radial image lines that form a complete screen of the image to be displayed. The number of radial image lines may vary according to the specific use, in one embodiment the number of radial image lines may be 1024, and other values may be envisaged which may be determined by the relationship $2\pi N$, where N is the number of radial pixels (i.e. electronic light sources present on the display substrate). The number of image lines may be selected to be higher, by choosing a higher value for N (higher than the number of electronic light sources), this oversampling may be useful in order to enhance image quality.

The resulting value may then be compared to a predetermined target value which is one that is considered to provide an acceptable image display. In case the comparison shows a deviation from the predetermined target value, the image controller may generate:

a command transmitted to a driving circuitry (not shown) of the actuator 120 thereby causing the driving circuitry to adjust the speed of the actuator and as a consequence, adjust the movement of the display substrate 240 so as to display the image without, or substantially free of, instability effects; or a command transmitted to a line data transmission unit, for example a known transmitter (not shown) thereby causing the line data transmission unit to adjust the transmission rate sent to the display substrate 240 and as a consequence, adjust the display rate of the display substrate 240 so as to display the image without, or substantially free of, instability effects.

The line data transmission may be adjusted in conformity with the calculated cycle time of the last cyclic movement. Alternatively, the line data transmission may be adjusted in conformity with the calculated cycle time obtained from a number of the last (most recent) cyclic movements. For example, an average value or a predictive algorithm may be employed that calculates a cycle time based on the values of the most recent cycle times.

Advantageously, the image controller also predicts the next cycle time and adjusts the line data transmission rate based on, or having regard to, such prediction.

The image controller 220 and other image controllers disclosed herein may be any known processing unit such as for example an FPGA, suitably programmed.

The optical emitter 250 may comprise one or more sources of emission of optical signal (including a plurality of optical emitters). Likewise, the optical receiver 270 may comprise one or more elements of reception of optical signal (including a plurality of optical receivers). Therefore, in some embodiments more than one optical receivers may receive optical signal from one or more optical emitters. This possibility may be advantageous in cases where feedback information (in addition to the optical coupling information as described above) needs to be exchanged between the moving parts (including but not limited to the display substrate and any parts involved in conveying movements from the actuator to the display substrate) and the fixed parts (including but not limited to videoconferencing data transmitter and image controller). One example of exchange of such feedback information may be information related to the temperature of the moving parts in order to avoid overheating. Another example of such feedback information may be information received from a user interface. For example, the videoconferencing terminal may comprise a touch-sensitive screen and the display substrate may comprise detectors that can detect changes as a user touches the screen. The use of touch-sensitive screen is disclosed in the above-referenced document published as U.S. Publication No. 2011/0149012. Therefore, the feedback information detected by the detectors may be provided to other parts of the videoconferencing terminal or other equipment in the videoconferencing network.

In such cases, one optical emitter may transmit an optical signal to an optical receiver in an operation for maintaining the display image stabilized (as already discussed with reference to FIG. 2), and another optical emitter may transmit to a second receiver, feedback information for example related to the temperature status of one or more moving parts by way of another optical signal. Other combinations of exchange of feedback information may also be envisaged within the scope of the present disclosure.

According to some alternative embodiments, the optical emitter may be also located at a fixed position (as opposed to being installed on the display substrate and thus being movable). FIG. 3 illustrates a schematic representation of certain elements of a videoconferencing terminal constructed according to this alternative embodiment. In FIG. 3, unless otherwise provided, like elements have been given like reference numerals as those of FIG. 2.

Referring to FIG. 3, the characteristics and functionalities of certain elements of the videoconferencing terminal such as those of the data storage module 210, the image controller 220 and the data link 230 are similar to those described in relation to the embodiments of FIG. 2. Therefore, further description related to these elements is considered not necessary.

According to the embodiment of FIG. 3, and differently from that of FIG. 2, an optical emitter 251 is mounted at a suitable fixed location, as shown. The optical emitter 251 is configured to emit an optical signal 260.

An optical receiver 270 is installed at a location suitable and preferably optically aligned with the optical emitter 251 for receiving the optical signal 260, as shown in the embodiment of FIG. 3. However, differently from the embodiment of FIG. 2, the optical receiver 270 may receive the optical signal 261 continuingly during a major period of the cyclic movement of the display substrate 240 as shown by solid lines (arrow A shows the direction of movement). Thus, due to the existence of optical alignment between the optical receiver 270 and the optical emitter 251 and the absence of an obstacle on an optical coupling path between these two elements during a major period of the cyclic movement of the display substrate 240, the optical signal is continuously received by the optical receiver 270 until it is interrupted at an instant at which the display substrate 240 enters into a position in which it blocks the coupling path of the optical signal 260 between the optical emitter 251 and the optical receiver 270. This blocking position is schematically shown in FIG. 3 by reference P and the display substrate 240 is shown by way of broken lines.

Upon receipt of the optical signal 260 by the optical receiver 270, the latter generates a detection signal 281 which is input into the image controller 220. As the display substrate 240 moves (e.g. rotates) to the blocking position P, the optical coupling between the optical emitter 251 and the optical receiver 270 is interrupted. The interruption of said optical coupling causes the optical receiver 270 to stop generating the detection signal 281. As the display substrate 240 continues its movement, thus leaving position P, the blocking of the optical signal 260 by the display substrate 240 terminates and the optical coupling is reestablished between the optical emitter 251 and the optical receiver 270. This situation continues until the display substrate 240 completes a cycle and arrives back to the position P where optical coupling is again blocked. At this occurrence, the optical receiver 270 once again stops the generation of a detection signal 281 which is input into the image controller 220.

The image controller 220 may be programmed to calculate a cycle time relative to the cyclic movement of the display substrate 240, based on the occurrence of the first interruption and the subsequent interruption of the detection signal 281. Once the cycle time has been calculated, the procedure for stabilizing the display image on the videoconferencing terminal is followed in a similar manner as that described with reference to FIG. 2.

The optical emitter 250 or 251 may be any known device suitable for the specific operation. For example, the optical emitter 250 may be a collimated infrared light source.

The optical receiver 270 may be any known device suitable for the specific operation. For example, the optical receiver 270 may be a lensed infrared detector with a Schmidt trigger logic.

Figure 4:
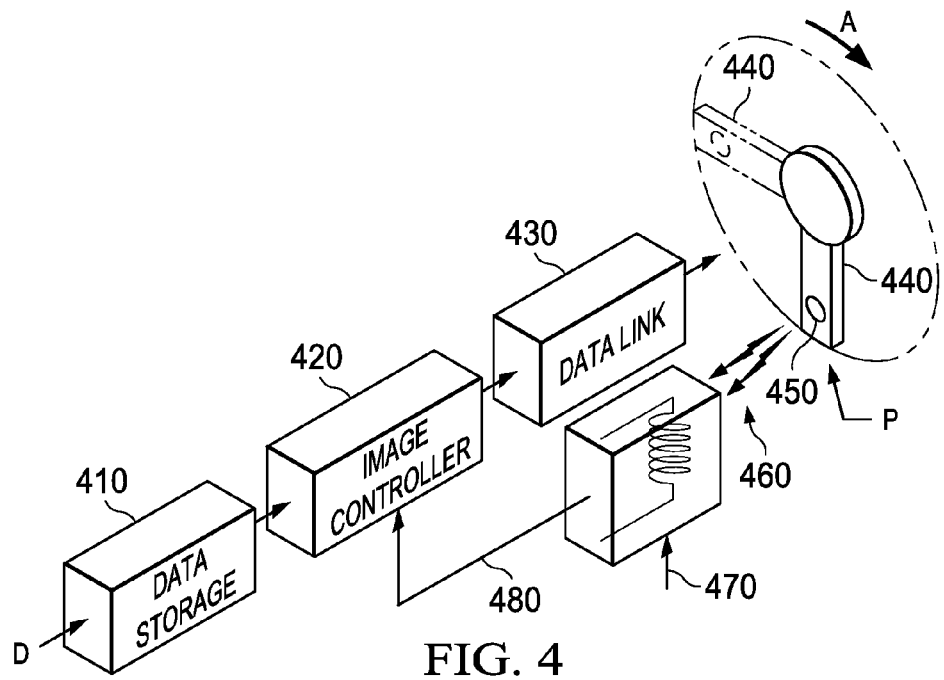
FIG. 4 illustrates a schematic representation of certain elements of yet another embodiment of a videoconferencing terminal constructed according to the principles of the disclosure.

FIG. 4 illustrates a representation of certain elements of an alternative embodiment of a videoconferencing terminal constructed according to the principles of the invention. In FIG. 4, like elements have been given reference numerals baring the same last two digits as those of FIG. 2 (e.g. element 220 in FIG. 2 is similar to element 420 in FIG. 4). Unless otherwise provided, the principles of operation of the videoconferencing terminal of FIG. 4 are similar to those of the terminal of FIG. 2, for which further description is considered not necessary. The embodiment of FIG. 4 differs however from the embodiment of FIG. 2 in that instead of the use of an optical emitter and an optical receiver as a proximity sensor assembly in FIG. 2, in the embodiment of FIG. 4 use is made of magnetic detection as will be described below.

Referring back to FIG. 4, the videoconferencing terminal according to the present embodiment comprises a magnetic proximity sensor assembly comprising a combination of a magnetic detector 470 such as for example a solenoid and a magnetic booster piece 450 which may be made for example of a metal capable of causing induction, such as iron. In some embodiments, the magnetic detector 470 may be located at a fixed position and the magnetic booster piece 450 may be placed on the body of the display substrate 440. With this arrangement, as the display substrate 440 moves in cyclic movement (e.g. rotates), at a certain moment in the cyclic movement of the display substrate 440, the magnetic booster piece 450 approaches the magnetic detector 470. This is shown in FIG. 4 at position P relative to the movement of the display substrate 440. The movement of the magnetic booster piece 450 in proximity to the magnetic detector 470 induces a change in the magnetic field present in the magnetic detector 470. This effect is schematically represented in FIG. 4 by arrows 460.

The change in the magnetic field in the magnetic detector 470 may be converted into an electric signal 480 which constitutes a detection signal that is then input in the image controller 420. This may be done for example by a current which is induced in the solenoid of the magnetic detector 470 as is known in the art.

From this point on, the operation of the image controller and other elements of the terminal of FIG. 4 are substantially similar to those of FIG. 2.

In some embodiments, the magnetic booster piece may be located at a fixed position and the magnetic detector may be placed on the body of the display substrate. With this arrangement (not shown), as the display substrate moves in cyclic movement (e.g. rotates), at a certain moment in the cyclic movement of the display substrate, the magnetic detector approaches the magnetic booster piece. The movement of the magnetic detector in proximity to the magnetic booster piece induces a change in the magnetic field present in the magnetic detector. The change in the magnetic field in the magnetic detector may be converted into an electric signal which constitutes a detection signal that is then input in the image controller (which may be also located on the display substrate).

From this point on, the operation of the image controller and other elements of the terminal of FIG. 4 are substantially similar to those of FIG. 2.

As mentioned above, the image controller may be located at any convenient position. In some embodiments, the image controller may be located at a fixed position. In some alternative embodiments, the image controller may be located on the body of the display.

In case the image controller is located at a fixed position, the commands generated by the image controller, either transmitted to a driving circuitry or transmitted to a line data transmission unit (generally referred to as commands) may be conveyed to a destination using any known means, for example by a simple wiring connection.

Alternatively, in case the image controller is located on the body of the display substrate, the commands generated by the image controller may be transmitted to an appropriate destination using an optical link or a radio link as will be described with reference to FIG. 5a and FIG. 5b respectively.

Figure 5A:
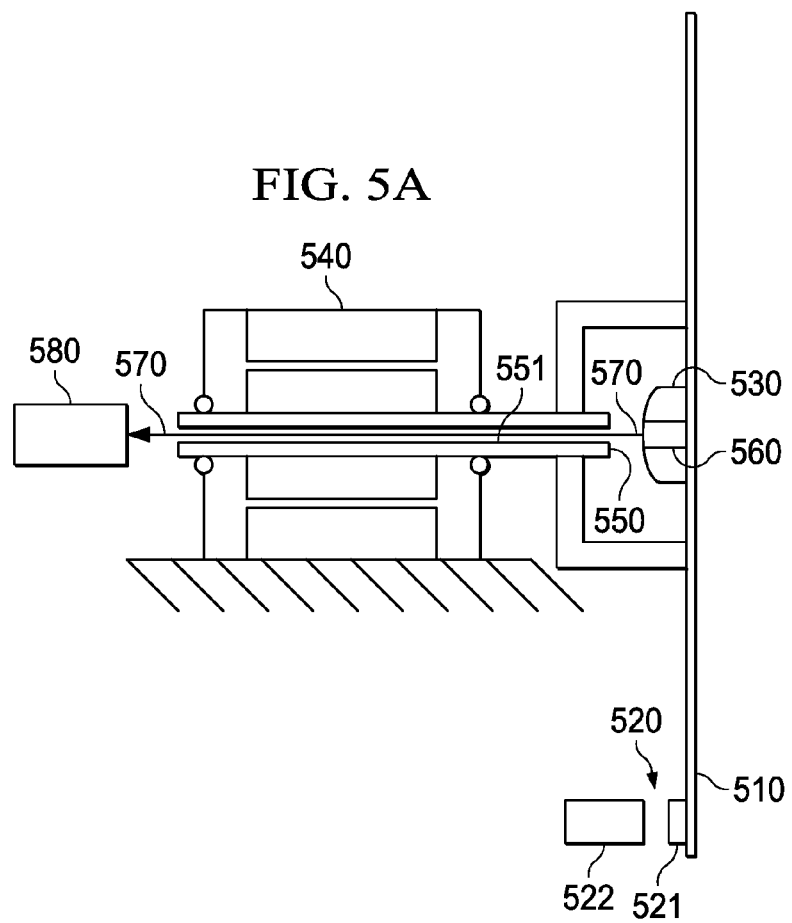
FIG. 5a and FIG. 5b illustrate schematic representations of certain elements of some embodiments of a videoconferencing terminal constructed according to the principles of the disclosure.

Referring to FIG. 5a, a display substrate 510 is illustrated which is configured to undergo a cyclic movement caused by the operation of an actuator 540 as already described. The movement generated by the actuator is transferred to the display substrate 510 by known means, such as for example a shaft 550 as shown in FIG. 5a. A proximity sensor assembly, generally shown by reference numeral 520, is configured to generate a detection signal as already described with reference to the embodiments of FIGS. 2, 3 and 4. Thus the proximity sensor assembly 520 may operate using optical means or magnetic means. The proximity sensor assembly 520 comprises a first detection element 521 and a second detection element 522. The detection signals (as described above) may be generated by the first detection element 521 of the proximity sensor assembly 520 which is located on the body of the display substrate 510.

An image controller 530 is located on the display substrate 510. Preferably the image controller 530 is located at a central part of the display substrate 510 as shown in FIG. 5a. Detection signals generated by the proximity sensor assembly 520 may be input from the first detection element 521 into the image controller 530 by known means such as wires (not shown).

Once the detection signals are received by the image controller 530, the latter may calculate the cycle time and thereafter generate the adjustment commands in order to display the image without, or substantially free of, instability effects as described above.

In the embodiment of FIG. 5a, said commands may be transmitted from the image controller 530 by way of an optical link. An optical emitter 560 may be located at a convenient location on the display substrate 510. Preferably the optical emitter 560 is located at a central location relative to the display substrate 510 as shown in FIG. 5a. Furthermore, an optical receiver 580 is located at a convenient location so as to receive an optical signal 570 transmitted from the optical emitter 560. Preferably shaft 550 has a through-hole 551 present across a longitudinal axis thereof, thereby allowing for a passage of the optical signal through the longitudinal hole 551 and reach the optical receiver 580 as shown in FIG. 5a. Upon receiving the optical signal 570, the optical receiver 580 may then convert the received signal into appropriate signal formats, e.g. an electric signal, which may be used for any adjustments required in the speed of rotation of the actuator 540 or the transmission rate of the display data.

Commands generated by the image controller 530 may be converted into optical signals by known means such as for example a light emitting diode (LED), or the like.

Preferably a storage unit (not shown), e.g. a memory, may be used to store compressed or raw image data on the moving part. Compressed image data, known in the art, is an image that has been processed to reduce the image file size by sacrificing some of the image details. Image data may be stored and transmitted in various formats for example as two dimensional RGB pixel arrays (Raw data), as multiple line data to be used to directly generate line commands (also a form of raw data), and both can also be compressed using standard techniques such as run length encoding (RLE), jpeg or motion jpeg depending on the computing power of the image controller. A raw image may be an image that has not been processed. In such cases, the optical emitter 560 may transmit the compressed or raw image data, preferably, at a lower data rate than needed by the moving display substrate. The image controller mounted on the display substrate (thus movable) may then process this data and generate commands to adjust the line data to be fed to the light sources as needed. Transmitting at a lower rate may have the advantage of requiring less expensive hardware for the transmission.

Figure 5B:
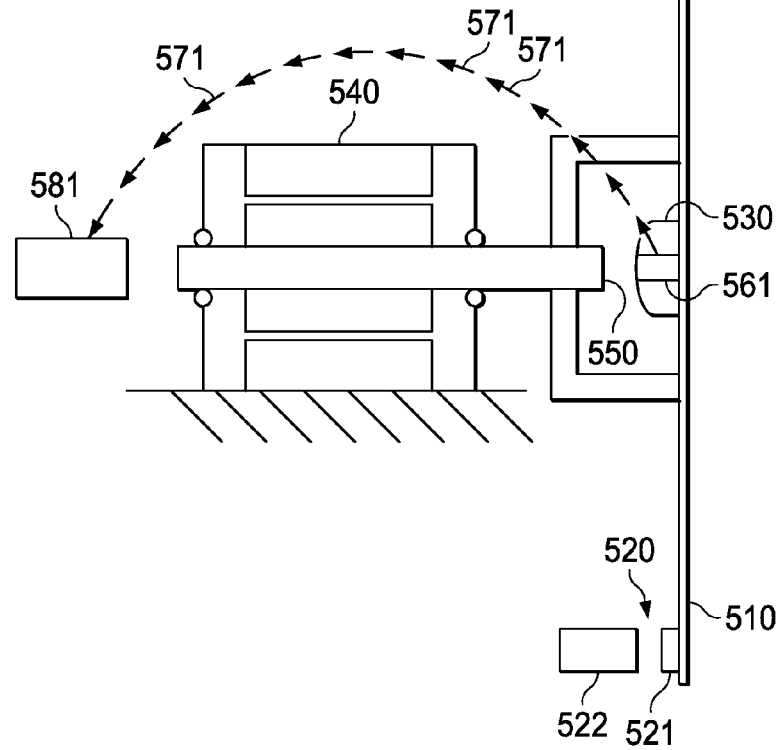

Referring now to FIG. 5b, an alternative embodiment is provided in which the image controller 530 is located on the body of the display substrate. In FIG. 5b, unless otherwise provided, like elements have been given like reference numerals. Unless otherwise provided, the principles of operation of the videoconferencing terminal of FIG. 5b are similar to those of the terminal of FIG. 5a, for which further description is considered not necessary.

The videoconferencing terminal of FIG. 5b differs from that of FIG. 5a in that commands may be transmitted from the image controller 530 by way of a radio link. A radio transmitter 561 may be located at a convenient location on the display substrate 510. Preferably the radio transmitter 561 is located at a central location relative to the display substrate 510 as shown in FIG. 5b. Furthermore, a radio receiver 581 is located at a convenient location so as to receive a radio signal 571 transmitted from the radio transmitter 561. Upon receiving the radio signal 571, the radio receiver 581 may then convert the received signal into appropriate signal formats, e.g. an electric signal, which may be used for any adjustments required in the speed of rotation of the actuator 540 or the transmission rate of the display data.

Commands generated by the image controller 530 may be converted into radio signals by known means such as for example an antenna. Similar to the embodiment of FIG. 5a, a storage unit with similar functionalities may also be used in the embodiment of FIG. 5b.

In some embodiments, where the image controller is mounted on the display substrate 510, the use of an optical link or a radio link to transmit the commands to parts of the system other than the display substrate 510 (as described with reference to FIG. 5a and FIG. 5b respectively) may be avoided. This may be the case where a synchronous actuator, such as a synchronous electrical motor, is used which is configured to operate at a substantially constant nominal speed. The image controller may then generate commands to adjust the line data transmission rate of the displayed image. The image controller may use a data storage unit (as one described with reference to FIGS. 2, 3 or 4) in order to generate or adjust the image (asynchronously with respect to the speed of the display substrate) based on detection signals received from the proximity sensor which is also mounted on the display substrate.

Figure 6:
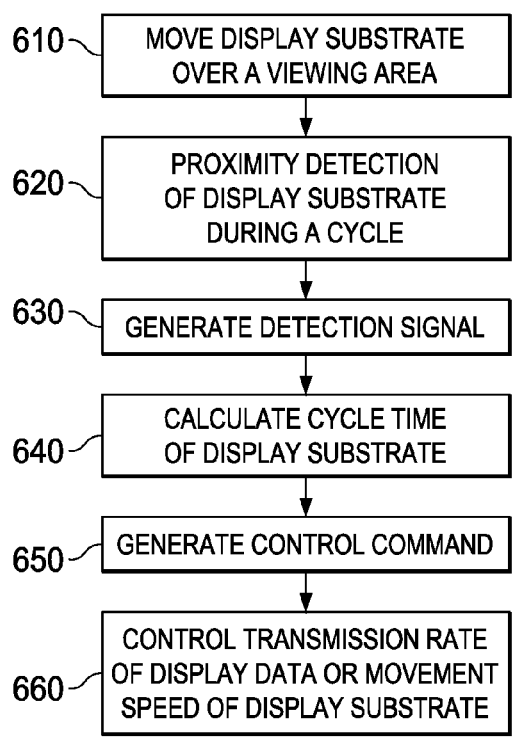
FIG. 6 illustrates a flow diagram of one embodiment of a method for image stabilization in a videoconferencing terminal carried out according to the principles of the disclosure.

FIG. 6 illustrates flow diagram of an embodiment of a method 600 for image stabilization in videoconferencing. A terminal as described herein may be used to perform the method. For the sake of briefness, the following steps of the method 600 are described below.

At an initial stage, step 610, a display substrate is moved in a cyclic movement over a viewing area displaying a display data. The display substrate occupies less than an entirety of the viewing area.

In a step 620, a proximity sensor detects the proximity of the display substrate as it moves during a cycle. As mentioned above, the proximity detection may be made by optical means, i.e. an optical emitter and an optical receiver configured to establish optical coupling, or by magnetic means, i.e. a magnetic detection element and a magnetic booster piece.

In a step 630, the proximity sensor generates a detection signal upon detecting the proximity of the display substrate as described in previous step 620.

In a step 640 a cycle time of the cyclic movement of the display substrate is calculated. This is done by an image controller. As mentioned above, the image controller may be located at a fixed position or on the body of the display substrate. Also the cyclic movement of the display substrate may be calculated depending on the specific configuration in each embodiment. For example in case of using optical coupling for proximity detection, depending on whether the optical emitter is movable or fixed, the calculation may respectively correspond to the time elapsed between one optical coupling to a subsequent optical coupling or to the time elapsed from the blockage of one optical coupling to the blockage of a subsequent optical coupling. Preferably the cycle time calculated may then be divided into a number of image lines that form a complete screen of the image to be displayed. The resulting value, so-called line-data, may then be compared to a predetermined target value which is one that is considered to provide an acceptable image display.

In a step 650, the image controller generates a control command. As mentioned above, the control command in order to adjust either the transmission rate of the display data to the display substrate, or the movement of the display substrate caused by the actuator is controlled.

In step 660, as a result of the control command generated by the image controller to an appropriate element of the terminal (as described below), one of the following actions may be performed:

upon transmitting the control command to a line data transmission unit, the line data transmission unit may adjust the transmission rate sent to the display substrate and as a consequence, the display rate of the display substrate is adjusted so as to display the image without, or substantially free of, instability effects; or upon transmitting the control command to a driving circuitry of the actuator, the speed of the actuator is adjusted and, as a consequence, the movement of the display substrate is adjusted so as to display the image without, or substantially free of, instability effects.

At least a portion of the above-described apparatuses and methods may be embodied in or performed by various conventional digital data processors or computers, wherein the computers are programmed or store executable programs of sequences of software instructions to perform one or more of the steps of the methods, e.g., steps of the method of FIG. 6. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, e.g., one or more of the steps of the method of FIG. 6, or functions of the apparatuses described herein such as an image controller.

Certain embodiments disclosed herein further relate to computer storage products with a non-transitory computer-readable medium that have program code thereon for performing various computer-implemented operations that embody, for example, the image controller, or carry out at least some of the steps of the methods (e.g., the method 600 FIG. 6) set forth herein. Non-transitory used herein refers to all computer-readable media except for transitory, propagating signals.

The media and program code may be those specially designed and constructed for the purposes of the invention, or they may be of the kind well known and available to those having skill in the computer software arts. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which the application relates will appreciate that other and further additions, deletions, substitutions and modifications may be made to the described embodiments. Additional embodiments may include other specific terminal. The described embodiments are to be considered in all respects as only illustrative and not restrictive. In particular, the scope of the invention is indicated by the appended claims rather than by the description and figures herein. The various embodiments may be combined as long as such combination is compatible and/or complimentary. All changes that come within the meaning and range of equivalency of the claims are to be embraced within their scope.

What is claimed is:

1. An apparatus, comprising:
a display substrate occupying less than an entirety of a viewing area and configured to display data;
an actuator configured to move the display substrate in a cyclic movement over the viewing area;
a proximity sensor assembly configured to generate, at least once during a cycle of the movement of the display substrate, a detection signal; and
an image controller configured to receive the detection signal generated by the proximity sensor assembly, calculate a cycle time of the cyclic movement of the display substrate and generate a command to control at least one of a transmission rate of the display data to the display substrate and the movement of the display substrate caused by the actuator.

2. The apparatus of claim 1, wherein the proximity sensor assembly comprises an optical emitter and an optical receiver.

3. The apparatus of claim 1, wherein the proximity sensor assembly comprises a magnetic detector and a magnetic booster piece.

4. The apparatus of claim 1, wherein the image controller is configured to divide the cycle time into a number of radial image lines that form a complete screen of the image to be displayed.

5. The apparatus of claim 1, wherein the image controller is configured for generating a command for a driving circuitry of the actuator, thereby causing the driving circuitry to adjust the speed of the actuator.

6. The apparatus of claim 1, wherein the image controller is configured for generating a command for a line data transmission unit, thereby causing the line data transmission unit to adjust the transmission rate sent to the display substrate.

7. The apparatus of claim 1, wherein the image controller is located on the display substrate.

8. The apparatus of claim 7, wherein the image controller is configured to transmit a command using an optical link.

9. The apparatus of claim 7, wherein the image controller is configured to transmit a command using a radio link.

10. The apparatus of claim 7, wherein the actuator is a synchronous actuator, and the image controller is configured to generate commands to adjust the line data transmission rate of the displayed image using a data storage unit to generate said command.

11. The apparatus of claim 2, wherein the optical emitter comprises a plurality of sources of emission of optical signal.

12. The apparatus of claim 2, wherein the optical receiver comprises a plurality of elements of reception of optical signal.

13. The apparatus of claim 1, wherein at least one optical emitter transmits feedback information to at least one optical receiver.

14. A method for image stabilization in videoconferencing comprising:
   moving a display substrate in a cyclic movement over a viewing area and displaying a display data, the display substrate occupying less than an entirety of the viewing area;
   generating by a proximity sensor assembly, at least once during a cycle of the movement of the display substrate, a detection signal;
   receiving by an image controller the detection signal generated by the proximity sensor assembly;
   calculating a cycle time of the cyclic movement of the display substrate; and
   controlling at least one of a transmission rate of the display data to the display substrate and the movement of the display substrate caused by the actuator.

15. The method of claim 14, wherein the optical receiver receives the optical signal during an optical coupling period in which the movement of the display substrate causes the optical emitter to establish optical coupling with the optical receiver.

16. The method of claim 14, wherein the optical receiver receives the optical signal through an optical coupling path until a time at which the display substrate moves to a position at which it blocks the optical coupling path between the optical emitter and the optical emitter.

17. The method of claim 14, wherein the optical receiver generates a detection signal when the optical emitter moves to a position to establish optical coupling.

18. The method of claim 14, wherein the optical receiver generates a detection signal until the optical coupling is blocked by the display substrate.

19. The method of claim 14, wherein the image controller generates a command for transmission to a line data transmission unit, causing the line data transmission unit to adjust the transmission rate sent to the display substrate and thereby adjust the display rate of the display substrate.

20. The method of claim 14, wherein the image controller generates a command for transmission to a driving circuitry of the actuator, causing the driving circuitry to adjust the speed of the actuator and thereby, adjust the movement of the display substrate.

* * * * *